United States Patent
Kyle

(10) Patent No.: US 9,353,323 B2
(45) Date of Patent: May 31, 2016

(54) METHOD AND APPARATUS FOR PRODUCING LIQUID HYDROCARBON FUELS

(71) Applicant: ECOKAP TECHNOLOGIES LLC, Miami, FL (US)

(72) Inventor: Ronald Kyle, Akron, OH (US)

(73) Assignee: ECOKAP Technologies LLC, Miami, FL (US)

( * ) Notice: Subject to any disclaimer, the term of this patent is extended or adjusted under 35 U.S.C. 154(b) by 0 days.

(21) Appl. No.: 14/746,786

(22) Filed: Jun. 22, 2015

(65) Prior Publication Data

US 2016/0024405 A1 Jan. 28, 2016

Related U.S. Application Data

(63) Continuation of application No. 14/178,658, filed on Feb. 12, 2014, now abandoned, which is a continuation-in-part of application No. 14/067,355, filed on Oct. 30, 2013, now abandoned, which is a continuation-in-part of application No. 14/041,731, filed on Sep. 30, 2013, now abandoned, which is a (Continued)

(51) Int. Cl.
*C10G 69/00* (2006.01)
*C10K 3/02* (2006.01)
(Continued)

(52) U.S. Cl.
CPC .............. *C10K 3/026* (2013.01); *B01J 19/126* (2013.01); *C10G 2/32* (2013.01); *C10G 2/33* (2013.01); *C10G 15/08* (2013.01); *C10J 3/46* (2013.01); *C10J 3/76* (2013.01); *C10K 1/003* (2013.01); *C10K 1/004* (2013.01); *C10K 1/005* (2013.01); *C10K 1/02* (2013.01); *C10K 1/04* (2013.01); *C10G 2300/4037* (2013.01); *C10G 2300/4043* (2013.01); *C10G 2300/4081* (2013.01); *C10G 2300/807* (2013.01); *C10J 2300/093* (2013.01); *C10J 2300/0959* (2013.01); *C10J 2300/0969* (2013.01); *C10J 2300/0973* (2013.01); *C10J 2300/0976* (2013.01); *C10J 2300/0986* (2013.01); *C10J 2300/123* (2013.01); *C10J 2300/1659* (2013.01); *C10J 2300/1807* (2013.01); *C10J 2300/1815* (2013.01); *Y02P 20/146* (2015.11); *Y02P 30/446* (2015.11)

(58) Field of Classification Search
CPC ........ C10K 3/026; C10K 1/004; C10K 1/003; C10K 1/04; C10K 1/02; C10K 1/005; C10J 3/46; C10J 3/76; C10J 2300/1659; C10J 2300/1815; C10J 2300/1807; C10G 15/08; C10G 2/33; C10G 2/32; B01J 19/126
See application file for complete search history.

(56) References Cited

U.S. PATENT DOCUMENTS 3,505,204 A * 4/1970 Hoffman ................ C10G 1/086
    208/391
4,435,374 A * 3/1984 Helm, Jr. ............... B01J 19/126
    204/157.43

(Continued)

*Primary Examiner* — Randy Boyer
*Assistant Examiner* — Juan Valencia
(74) *Attorney, Agent, or Firm* — David S. Alavi

(57) ABSTRACT

A method of converting carbon containing compounds such as coal, methane or other hydrocarbons into a liquid hydrocarbon fuel utilizes a high pressure, high temperature reactor which operates upon a blend of a carbon compound including $CO_2$ and a carbon source, a catalyst, and steam. Microwave power is directed into the reactor. The catalyst, preferably magnetite, will act as a heating media for the microwave power and the temperature of the reactor will rise to a level to efficiently convert the carbon and steam into hydrogen and carbon monoxide.

23 Claims, 8 Drawing Sheets

Related U.S. Application Data continuation-in-part of application No. 13/942,320, filed on Jul. 15, 2013, now abandoned, which is a continuation-in-part of application No. 13/185,708, filed on Jul. 19, 2011, now abandoned.

(60) Provisional application No. 61/423,768, filed on Dec. 16, 2010, provisional application No. 61/419,653, filed on Dec. 3, 2010, provisional application No. 61/416,889, filed on Nov. 24, 2010, provisional application No. 61/380,954, filed on Sep. 8, 2010.

(51) Int. Cl.
| | | |
|---|---|---|
| *C10G 2/00* | (2006.01) | |
| *B01J 19/12* | (2006.01) | |
| *C10K 1/00* | (2006.01) | |
| *C10K 1/02* | (2006.01) | |
| *C10K 1/04* | (2006.01) | |
| *C10G 15/08* | (2006.01) | |
| *C10J 3/76* | (2006.01) | |
| *C10J 3/46* | (2006.01) | |

(56) References Cited

U.S. PATENT DOCUMENTS

| | | | |
|---|---|---|---|
| 7,887,694 B2 * | 2/2011 | Constantz | B01D 3/1425 205/480 |
| 8,779,013 B2 | 7/2014 | Livneh | |
| 2003/0162846 A1 * | 8/2003 | Wang | B01J 8/0488 518/703 |
| 2004/0209303 A1 * | 10/2004 | Martin | C12N 11/00 435/6.11 |
| 2010/0005720 A1 * | 1/2010 | Stadler | C10J 3/76 48/67 |
| 2012/0055851 A1 | 3/2012 | Kyle | |
| 2013/0303637 A1 | 11/2013 | Kyle | |
| 2014/0051775 A1 | 2/2014 | Kyle | |
| 2014/0066526 A1 | 3/2014 | Kyle | |
| 2014/0163120 A1 | 6/2014 | Kyle | |
| 2014/0346030 A1 | 11/2014 | Livneh | |
| 2014/0356246 A1 | 12/2014 | Livneh | |

* cited by examiner

Reactor for converting coal and carbon dioxide to petroleum products

Reactor for converting transportation vehicle exhaust emissions to Petroleum Products Haber Bosch Ammonia process for producing ammonia from methane or natural gas Reactor system for converting flue gas and other fossil fuel exhausts to petroleum products and ammonia with no carbon dioxide emissions Reactor system for converting flue gas and other fossil fuel exhausts to petroleum products and ammonia with no carbon dioxide emissions

METHOD AND APPARATUS FOR PRODUCING LIQUID HYDROCARBON FUELS

BENEFIT CLAIMS TO RELATED APPLICATIONS

This application is a continuation of U.S. non-provisional application Ser. No. 14/178,658 filed Feb. 12, 2014 in the name of Kyle, which is a continuation-in-part of U.S. non-provisional application Ser. No. 14/067,355 filed Oct. 30, 2013 in the name of Kyle, which is a continuation-in-part of U.S. non-provisional application Ser. No. 14/041,731 filed Sep. 30, 2013 in the name of Kyle, which is a continuation-in-part of U.S. non-provisional application Ser. No. 13/942,320 filed Jul. 15, 2013 in the name of Kyle, which is a continuation-in-part of U.S. non-provisional application Ser. No. 13/185,708 filed Jul. 19, 2011 in the name of Kyle. Each of said non-provisional applications is incorporated by reference as if fully set forth herein. U.S. non-provisional application Ser. No. 13/185,708 claims benefit of: U.S. provisional App. No. 61/423,768 filed Dec. 16, 2010 in the name of Kyle; U.S. provisional App. No. 61/419,653 filed Dec. 3, 2010 in the name of Kyle; U.S. provisional App. No. 61/416,889 filed Nov. 24, 2010 in the name of Kyle; and U.S. provisional App. No. 61/380,954 filed Sep. 8, 2010 in the name of Kyle. Each of said provisional applications is incorporated by reference as if fully set forth herein.

FIELD OF THE INVENTION

This invention relates to a method of producing hydrocarbon fuels, primarily from sources of carbon-containing compounds such as coal and carbon dioxide, and more particularly to a method for performing the process involving a reactor powered by microwave energy. Carbon dioxide produced by the process and additional carbon dioxide from naturally occurring sources and the exhausts from the combustion of fossil fuels may also be consumed as feedstock for this process, thus lowering the levels of this greenhouse gas.

Another embodiment of this invention relates primarily to the conversion of carbon dioxide from the sources described above to petroleum products.

The invention also embodies the use of these reactors in combination to produce Petroleum Products and ammonia from nitrogen and carbon dioxide contained in the exhausts from applications that are dependent on the combustion of fossil fuels and from naturally occurring sources.

BACKGROUND

The desirability of creating liquid hydrocarbon fuels from coal is well recognized, and a number of processes for performing the conversion have been used commercially and others have been proposed. However, all the previous methods and apparatus for practicing the methods have been relatively complicated and inefficient. There still exists a need for a simple, one step, continuous process that will produce liquid petroleum products from a blend of coal and water in the presence of a catalyst and a single reactor, thus substantially reducing capital and operating costs of the operation.

The desirability of converting carbon dioxide to useful valuable products is also well recognized. But, the numerous extensive experiments to date have not produced a reasonable economic solution. So the need still exists for a simple, one step, continuous process that will produce Petroleum Products from a blend of carbon dioxide and water in the presence of a catalyst and a single reactor thus providing an economical and efficient solution for controlling carbon dioxide emissions and reducing the level of carbon dioxide in the atmosphere.

It also is desirable to produce ammonia without the carbon dioxide emissions that are associated with the processes currently used to manufacture ammonia.

SUMMARY

The proposed process will be used to produce a mixture of petroleum-like products that are equivalent to liquid fuels and other hydrocarbons that are produced from petroleum. This stream of petroleum-like products (the "petroleum products") will be sold or transferred to a typical refining operation that will separate and further process them into useful products such as gasoline, diesel fuel, and other products. This unique process is a simple, one-step, continuous process that will produce these petroleum products from a blend of coal and water in the presence of a catalyst in a single reactor, thus reducing capital and operating costs by about 30%.

Currently converting coal into petroleum products requires complicated and expensive facilities and processes.

This unique, simple, one-step, continuous process also will be used to produce Petroleum Products from a blend of carbon dioxide and water in the presence of a catalyst in a single reactor. Hydrogen, other hydrogen containing materials, other elements, and compounds will be added as needed to balance the reactions. Converting carbon dioxide into Petroleum Products is a lower cost process than the carbon dioxide capture and storage alternatives currently under consideration and reduces or eliminates the risks associated with long-term carbon dioxide storage.

Combining two or more of these reactors in a configuration that will convert the carbon dioxide and nitrogen contained in fossil-fuel exhausts to Petroleum Products and ammonia will significantly reduce capital and operating costs and reduce or eliminate the risks of long-term carbon dioxide storage.

A blend of coal, a catalyst(s) such as magnetite and/or other metal catalysts, and steam are fed to the reactor as shown in FIG. 1. Oxygen and hydrogen and/or other hydrogen-rich compounds also may be added in the event the process requires more of these materials to balance the reactions than are generated in the reactor. The coal and catalyst(s) will be micronized so that the particle size of these materials is typically about 10 microns. However, the optimum particle size will be determined by the application and may range up to 70 microns.

Any reasonable type of the extensive U.S. and global coal reserves can be used: anthracite, bituminous, lignite, coal fines, etc. from any state or territory of the U.S. and any imported coal. The preferred method for micronizing the coal is outlined in my U.S. Pat. No. 8,440,946. However, any reasonable micronizing method may be used.

The catalyst magnetite is a naturally occurring ferromagnetic mineral with the chemical formula $Fe_3O_4$, and is one of several iron oxides and a member of the spinel group. The common chemical name is ferrous-ferric oxide. Magnetite is available in the sizes required for this reaction. Other metal catalysts such as nickel, copper, cobalt, aluminum, zeolite, and other suitable materials may be used separately or in any combination with each other and/or magnetite. Rare earth catalysts such as rhodium, palladium, platinum, and other suitable materials may be used for certain applications, but the less expensive catalysts are likely to be preferred for most applications. Other potential catalysts also are available, or can be made available, from catalyst suppliers in a form suitable for these reactions. The catalyst(s) may be contained in the reactor as a packed or fluidized bed, or other suitable configuration. The catalyst can be formed to a size and shape that will permit the micronized coal, gasses, and the other materials to flow reasonably through the catalyst. The catalyst(s) will act both as a heating medium and chemical catalyst, as they increase the rates of both processes, and after being used, they can be recovered and returned to the process or reasonably disposed of as process economics determine.

The reactor liner will be made from quartz, ceramics, glass, or any other suitable material that is transparent to microwave power and can withstand temperatures up to 1800 degrees Celsius and pressures up to 500 psig, depending on the application. The reactor can be reinforced with carbon fibers or other microwave transparent materials and configurations as necessary to withstand these conditions. For example, the reactor may be enclosed within a steel container, or other suitable container, and the cavity between the container and reactor may be pressurized with nitrogen, or other suitable material(s), to support the reactor in a manner such that the reactor structure would be subjected only to the differences in pressures inside and outside the reactor. Preliminary experiments suggest that the desired reactions will occur in the temperature range between 400 degrees Celsius and 800 degrees Celsius, and pressures at 150 psig or lower may be adequate for these reactions depending on the feeds, catalysts, microwave operation, output products, and other variables. The microwave energy source provides for much greater temperature control in the reactor, which may result in even lower average and peak operating temperatures and pressures. These lower temperatures and pressures will permit simpler and more economical reactor materials, reactor designs, and operations. Temperatures and pressures could vary widely depending on the application and the preference of the designer.

The temperatures will be somewhat higher in the bottom portion, the lower 30% to 50% of the reactor, and will convert the carbon dioxide and water to carbon monoxide and hydrogen. To maintain the required temperature for this process in this lower portion of the reactor, microwave power from one or more microwave units may be directed so that the energy can be focused on the carbon dioxide, steam, oxygen, catalyst mixture, and any other elements and compounds used to facilitate and balance the reactions in a manner that will maintain reasonable process control. The catalyst(s) will act as a heating medium for the microwave power and the temperature of the reactor mixture will quickly rise to that required to efficiently convert the reactor feeds into hydrogen and carbon monoxide. The reactor configuration, position, and operation can be modified to improve energy efficiency by balancing the endothermic and exothermic reactions. For example, it may be desirable to introduce the feeds at or near to the topmost portion of the reactor with the exothermic reactions occurring in the lower portion of the reactor. The reactor can be set at any angle from vertical to horizontal in order to facilitate the process. For some applications, such as some transportation vehicles, a horizontal or near horizontal position may be the most effective.

As soon as the hydrogen and carbon monoxide are produced in the presence of the magnetite or other catalyst(s) they will immediately react to form a mixture, or stream, of petroleum products such methane, ethane, propane, butane, alcohols, naphtha, gasoline, kerosene, gas oil, distillate, lube oils, motor oil, lubricants, grease, heavy fuel oils, aromatics, coke, asphalt, tar, waxes, etc. As these petroleum products are produced they add heat to the reactor and will rise to the top 50% or 70% of the reactor. A cooling water jacket(s) will be provided to cool this top portion of the reactor and help maintain a reasonable temperature profile in the reactor.

Carbon dioxide also is produced in the reactor and, as soon as it in generated, will combine with the steam and other materials in the reactor to form carbon monoxide and hydrogen, which will react to form more petroleum products. Simulations and laboratory experiments show that while multiple reactions are taking place simultaneously and are competing with each other, apparently the main carbon dioxide reaction is the Boudouard reaction (the conversion of carbon dioxide plus carbon to carbon monoxide), which is expressed as $CO_2+C \rightarrow 2CO$. Also expected is the conversion of carbon dioxide plus hydrogen to carbon monoxide plus water, which is expressed as $CO_2+H_2 \rightarrow H_2O+CO$. Hydrogen or hydrogen-rich chemical compounds, such as methane or natural gas, will be added to the reactor as necessary to provide enough hydrogen to facilitate the carbon dioxide conversion. Oxygen will also be added as needed for the reactions. The proposed process will produce only about one-half of the carbon dioxide that would be generated by the conventional methods that are currently used to produce petroleum products from coal and hydrocarbons. When methane is fed to the reactor either in combination with or as a replacement for the coal, the expected reaction is the conversion of carbon dioxide plus methane to carbon monoxide and hydrogen, which is expressed as $CO_2+CH_4 \rightarrow 2CO+2H_2$. While exhausts from the combustion of fossil fuels have to meet current regulations for particulates, carbon monoxide, and the other products of combustion, a co-benefit of the process is that it also will convert any carbon materials such as the particulates, hydrocarbons, and other products of combustion contained in the exhausts to Petroleum Products. For example, the oxides of nitrogen (NOx) and oxides of sulfur (SOx) will convert to carbon monoxide, carbon dioxide, and elemental nitrogen and sulfur. The carbon monoxide and carbon dioxide will be consumed in the process and the elements are relatively easy to separate and/or capture.

Another advantage of the proposed process is that the reactor coproduct carbon dioxide can be further converted to carbon monoxide by the injection of additional carbon dioxide into the reactor in accordance with the Le Chatelier principle. By this principle, approximately 50% of the sum of the carbon dioxide in the reactor plus the carbon dioxide injected into the reactor will be converted to carbon monoxide.

Consequently, using this proposed process in accordance with the Le Chatelier principle will effectively convert most or all of the coproduct carbon dioxide in the reactor to carbon monoxide, which will immediately react with hydrogen to form petroleum products. The excess carbon dioxide from this reaction can be re-injected into the reactor to convert the current coproduction carbon dioxide to carbon monoxide and petroleum products. Today's conventional processes have no reasonable method for using the excess coproduct carbon dioxide, so it typically must be removed and disposed of reasonably.

In addition to the carbon dioxide produced by the process, carbon dioxide feedstock also may be obtained from naturally occurring sources and sourced as a pure co-product from any industrial processes such as those related to petroleum refining, from flue gases or exhaust gases from electric-power generation plants, other industrial plants, stationary internal combustion engines, or any operation where fossil fuels are oxidized or burned to provide the source of energy. This process can be adapted for use on transportation vehicles, including highway, rail, and marine vehicles, to convert the carbon dioxide emissions from the fossil-fueled internal combustion engines to useful petroleum products as outlined in the following.

These reactors can be adapted for use on new vehicles and the fleet of more than 250 million existing fossil-fueled vehicles, from the largest trucks to sub-compact cars. Since the transportation sector currently has the largest carbon dioxide emissions, meeting the California regulations and the emission goals outlined by the EPA and Administration for carbon dioxide will require a major reduction of carbon dioxide emissions from these fleets of transportation vehicles. The reactors can also be adapted for use on railroad and marine transportation equipment. The fossil fuels currently used for these vehicles are motor gasoline, diesel fuel, JP4, JP8, ethanol, methanol, propane, natural gas, and other suitable fuels. These fuels may be used separately and in combination. Other fossil fuels and combinations of fossil fuels may be used as well.

A typical composition from a gasoline-fueled internal combustion engines used for these applications is nitrogen 71%, carbon dioxide 15%, water 13%, with carbon monoxide plus minor and trace quantities of other combustion products making up the balance. For diesel-fueled engines a typical composition is nitrogen 67%, carbon dioxide 13%, water 11%, with oxygen plus minor and trace quantities of other combustion products making up the balance.

The US Energy Information Agency (EIA) reported that the industry weighted average carbon dioxide emissions for current new light vehicle sales are about 298 grams per mile. US light vehicle producers will have to reduce carbon dioxide emissions by about 17% to meet the 250 grams per mile maximum set by the EPA/NHTSA regulation for 2016 and by about 45% to meet their 2025 regulation of 163 grams per mile. The EPA has set carbon dioxide limits for medium and heavy trucks, buses, vocational vehicles, etc. for 2018, which represent average per-vehicle reductions in greenhouse gas emissions of 17% for diesel powered vehicles and 12% for gasoline vehicles with a graduated phase-in approach that began in 2014. The addition of these reactors to these transportation vehicles will provide a solution for reducing the carbon dioxide in fossil fuel exhausts to meet these regulations, while providing consumers with the vehicles they need and want at prices they can afford.

The composition of the exhaust from these transportation vehicles is such that it can be fed directly to the reactors. The carbon dioxide in the exhaust will be converted to petroleum products as described herein utilizing a reactor or combination of reactors as the designer prefers. A portion or all of the water in the exhaust will also be used in the reactions. Since many vehicles are being converted to use combinations of natural gas with conventional gasoline and diesel fuels, natural gas will be readily available on many vehicles, and therefore is the preferred feedstock to provide additional hydrogen and carbon as needed to balance the reactions. However, many materials could be used including gasoline, diesel fuel oil, propane, butane, ethanol, bio diesel, etc. Water may also be added to provide more hydrogen to facilitate the reactions. FIG. 3 shows a typical application of this process for transportation vehicles. A similar installation could be used for stationary fossil fueled applications.

Upon completion of the reactions, the remaining clean exhaust mostly nitrogen, can then be separated and released into the atmosphere. The petroleum products produced can be stored on the vehicle, collected, and sent to a refinery for separation into specific refinery products. The Petroleum Products may be chilled to facilitate their collection and storage, or some combination of compression and refrigeration may be preferred. For some vehicles it may be reasonable to combine a portion or all of the petroleum products with the fuel(s) being used for that power plant, especially for gas turbine and diesel engines.

The electric power required to provide microwave power to these small reactors can be supplied by installing an electric generator on the vehicle, or by using batteries, capacitors, or other suitable potential and/or kinetic energy storage systems to power the microwave. The reactor requires about 0.2 to 1.2 kWh per 100 pounds of carbon dioxide feed depending on the percentage of carbon dioxide in the exhaust stream. The estimated electric power capacity required to operate the microwave, based on feeding the total engine exhaust to a reactor on a class 8 truck at highway speed, is estimated at approximately 3 kW, depending on the vehicle design and designer preference. Electric power for the chiller and/or compressor could be provided from the same source. For stationary applications electric power from a conventional source would be preferred.

When reactors are installed on these vehicles, the generator used to supply power to the microwave also can be used as a motor-generator to add a hybrid-electric conversion system to the vehicles. This hybrid-electric retrofit could reduce the base carbon dioxide emissions by 30% or more.

While exhausts from the combustion of fossil fuels for most transportation applications have to meet the current requirements for particulates, carbon monoxide, hydrocarbons, and other products of combustion, a co-benefit of the process is that it also will convert any carbon materials, such as the particulates, hydrocarbons, and other products of combustion, in the exhaust to petroleum products. For example, the oxides of nitrogen (NOx) and oxides of sulfur (SOx) will convert to carbon monoxide, carbon dioxide, and elemental nitrogen and sulfur. The carbon monoxide and carbon dioxide will be consumed in the process and the elements are relatively easy to separate and/or capture.

In addition to these highway vehicles, reactors also can be adapted for any other equipment that is powered by fossil-fueled engines, such as railway locomotives, marine vessels, off-the-road equipment, stationary engines that provide power to generate electricity, aircraft, and other similar applications.

Reactors also can be adapted for small heating plants such as those used for commercial applications, such as small businesses, private homes, and other applications where the management of carbon dioxide emissions is required or desired. This could be an interim solution to manage carbon dioxide emissions for these applications until they can be converted to zero-emissions power sources such as batteries, fuel cells, and electrified highways.

The unique flexibility of this process and reactor can be used to produce syngas, carbon monoxide and hydrogen, as a product. Experiments have shown that lowering the reactor pressure to approximately zero psig will halt the synthesis of the carbon monoxide and hydrogen to Petroleum Products so that a portion or all of the syngas can easily be removed from the reactor. The syngas then can be used as a fuel, a feedstock for other applications, profitable sales, or stored for later use.

This relatively simple continuous process and its microwave energy source will provide the process control needed so that rapid changes to the operating conditions, feedstocks, catalysts, etc. can be exploited to maximize the production of the most desired products to match seasonal and other changes in the demand for the products. This process flexibility will be useful to balance the volumes of the fossil-fuel exhausts from the very diverse application sources with the demand for the various reactor products.

Parties, who have a need for syngas for applications other than the production of Petroleum Products and/or have a need to sell syngas to balance their syngas production with their available volumes of fossil-fuel exhausts, will be able to use low-pressure reactors to reduce capital and operating costs.

The flexibility of this system to produce a mixture of syngas and petroleum products at low pressures or to maintain the production of syngas at pressures as low as zero psig may be especially useful for the reactors installed on transportation vehicles, where low pressures could be a benefit. The reactor products could then be blended directly into the fuel going to the vehicle's power plant, thereby eliminating the need to store the reactor products on the vehicle. This flexibility combined with advantages of the responsive and effective operational control provided by the microwave will support the adaptation of this system to a wide variety of applications while maintaining efficient performance at reasonable costs.

These reactors can also be adapted to produce ammonia.

Ammonia is produced from nitrogen and hydrogen under high pressure in the presence of a catalyst. The reaction was discovered in Germany by chemist Fritz Haber shortly before World War I and was developed into an industrial process by Carl Bosch. Hydrogen is usually produced by reacting methane found in natural gas with steam in a two-step process. The major reactions are as follows:

$$CH_4 + H_2O \rightarrow 3H_2 + CO$$

$$CO + H_2O \rightarrow CO_2 + H_2$$

Methane can also be produced by coal gasification.

Nitrogen is obtained by liquefying air and is then reacted with hydrogen to produce ammonia.

$$N_2 + 3H_2 \rightarrow 2NH_3$$

Ammonia currently is produced by the Haber Bosch Ammonia process and other similar processes. The Haber Bosch process is described in FIG. 4.

The current processes typically begin by converting methane and water to carbon monoxide and hydrogen or syngas. Air is introduced to that mixture and the mixture is converted into nitrogen, hydrogen and carbon monoxide. The next step is to convert the carbon monoxide to carbon dioxide and remove it from the process, leaving only nitrogen and hydrogen. The nitrogen and hydrogen are then catalytically reacted to ammonia. The reaction is exothermic.

The catalyst is somewhat more complicated than pure iron. It has potassium hydroxide added to it as a promoter which increases its efficiency. In this process, adding a catalyst doesn't produce any greater percentage of ammonia. Its only function is to speed up the reaction. Some producers use ruthenium rather than the iron-based catalysts. Ruthenium forms more active catalysts that permit using milder operating pressures.

KRB Inc. offers an advanced ammonia process that uses ruthenium as the active ingredient on a highly-stabilized graphitic base material. Reportedly this catalyst is 10-20 times more active than traditional magnetite catalyst, which allows a lower synthesis pressure, which reduces plant capital cost. Several other catalyst systems may be used, such as the barium-promoted cobalt on carbon is reported to be very active and less expensive than ruthenium.

This synthesis conversion is typically conducted at about 3,000 psig and between 400° C. to 450° C., as the gases are passed over four beds of catalyst. Since the synthesis is exothermic there is cooling between each pass in order to maintain the process at the desired reaction rate.

The proposed process can be used to produce ammonia from fossil fuel exhausts from various applications such as electric power generation, refineries, and other industrial equipment. The first step would be as shown in FIG. 5. The fossil fuel exhausts will be fed to the reactor along with methane, water, carbon dioxide, oxygen, and air depending on the application. The reactor will convert the products into carbon monoxide and hydrogen or syngas. The feed profile to the reactor will be designed to produce enough hydrogen to convert all the carbon monoxide to petroleum products with an excess to provide enough hydrogen to convert the nitrogen to ammonia. Otherwise the operation would be similar to that described above.

The Petroleum Products will be removed from the reactor for further processing and the nitrogen and excess hydrogen would be removed from the reactor and used as feed to the ammonia reactor shown in FIG. 6. The hydrogen and nitrogen are fed into the ammonia reactor at the temperature and pressure best suited for the catalysts and other preferences for the process. The microwave and heat exchanger will be balanced to maintain control of the reactor temperatures and pressures at the desired level. The ammonia will be recovered from the reactor and the unreacted hydrogen and nitrogen will be recycled to the reactor feed.

The Petroleum Products reactor and the Ammonia reactor can be utilized as a system, as shown in FIG. 7. The fossil fuel exhausts will be fed to the Petroleum Products reactor along with methane, water, carbon dioxide, oxygen, and air as required by the application. The Petroleum Products produced by that reactor will be sold or sent for further processing. The unreacted nitrogen and hydrogen will be sent as feed to the Ammonia reactor. The ammonia will produced from that reactor will be sold or sent for further processing and the unreacted nitrogen and hydrogen will be recycled to the feed of the Ammonia reactor.

The processes of the Petroleum Products reactor and the Ammonia reactor are combined in a single reactor as shown is FIG. 8. The fossil fuel exhausts will be fed to the Petroleum Products reactor along with methane, water, carbon dioxide, oxygen, and air as required by the application. The Petroleum Products reaction tends to be the most reasonable at temperatures in the 500 degrees Celsius to 800 degrees Celsius range and at pressures in the 200 psig to 400 psig range. However, as noted above, the temperatures and pressures could be substantially lower. The Ammonia reaction tends to be the most effective at temperatures in the 400 degrees Celsius to 500 degrees Celsius and pressures in the range of 2,000 psig to 3,000 psig. While it may be possible to have a range of temperatures that would work for both synthesis reaction, it may be necessary to provide a low pressure section of the reactor where the Petroleum Product will be produced and a high pressure section where the ammonia will be produced.

This process will provide a reasonable solution for utilities to meet the EPA regulations proposed on Sep. 20, 2013 that set limits at between 1,000 and 1,100 pounds per megawatt-hour for carbon dioxide emissions from new electric power generation plants. The EPA stated that during 2014 it will establish carbon pollution standards for existing power plants. The Clean Air Act requires the EPA to regulate new, modified, and existing facilities that have significant emissions of carbon dioxide. The EPA has suggested that refineries will be the next industry to be regulated.

It may be desirable to use other carbonaceous materials that will react as a reductant for the carbon dioxide to improve the reaction in various ways. For example, adding coal-bed methane, wet and dry natural gas, and other such materials, depending on the application and the availability and cost of these materials. Using these materials in combination with the carbon dioxide may assist the operation in several ways from simplifying the heat profile to assisting the operators to better control the production mix of the petroleum products.

Most organic and hydrogen-rich compounds or combination of these materials can be used in combination with the carbon dioxide or as a separate feedstock(s). This could facilitate the sustainability of materials such as, polymers, polymer products, recycled plastics, natural and synthetic rubbers, fabrics, tires, hoses, wood, wood products, paper, cardboard, foods, meat, vegetables, sugar cane, grains such as corn, corn stalks, plants, algae, natural and synthetic oils, alcohols, carbohydrates, fats, coconut and other shells, proteins, vegetables, meats, animal waste, garbage, alcohols, etc. While any carbon-containing material can be used, those richer in carbon are preferred to improve the economics. For low-carbon materials cost may still be justified by providing sustainability for certain materials.

For example, if it becomes desirable to produce a certain portion of the petroleum products from renewable feedstocks, then a certain portion of the feedstocks to the process can be renewable material(s) such as wood chips, sawdust, paper, algae, grain ethanol, cellulosic biomass, or any other suitable material. The renewable material(s) may be blended with the carbon dioxide or other feedstock(s).

In addition to the reactions noted above for carbon dioxide, simulations show that while multiple reactions are taking place simultaneously and are competing with each other, the apparent main carbon dioxide reactions are the conversion of carbon dioxide plus carbon to carbon monoxide, and the conversion of carbon dioxide plus hydrogen to carbon monoxide plus water. Hydrogen or hydrogen-rich chemical compounds, such as methane, natural gas, and water will be added to the reactor as necessary to provide enough hydrogen to facilitate the carbon dioxide conversion. When methane or natural gas is added, the conversion of carbon dioxide plus methane to carbon monoxide plus hydrogen is also an apparent reaction. Oxygen will also be added as needed to complete the desired reactions.

The carbon dioxide may be separated from these exhaust gases generated by the combustion of fossil fuels and fed to the reactor as described above, or it may be more reasonable to feed the total exhaust stream to the reactor.

For example, the flue gases from coal-fired electric power plants can be fed directly to the reactor. In this case, the carbon dioxide from the flue gasses will selectively react with carbon to form carbon monoxide, and with hydrogen to form carbon monoxide and water. Simulations and laboratory experiments confirm that it is reasonable to expect these reactions. The nitrogen in the flue gas will be released from the process into the atmosphere. The utilities may use the process referenced above for micronizing coal. This process will also clean the coal of sulfur, metals such as mercury, ash, etc. Cleaning the coal prior to combustion, combined with the usual post-combustion methods used to clean the regulated components from the flue gases, will insure that the flue gases released from the reactor, after the carbon dioxide has been removed and used as feedstock to produce petroleum products, will meet current emission regulations.

Another option is to add a separate reactor to convert the excess carbon dioxide from this process and carbon dioxide produced from other fossil-fueled processes to petroleum products. A blend of carbon dioxide, a catalyst(s) such as magnetite and/or other metal catalysts, and steam are fed to the reactor as shown in FIG. 2. Oxygen and or hydrogen or other hydrogen-rich compounds also may be added in the event the process requires more of these materials than are generated in the reactor. The catalyst(s) will be micronized so that the particle size is typically about 10 microns. However, the optimum particle size will be determined by the application.

Carbon dioxide may be obtained from naturally occurring sources and/or sourced as a pure co-product from any industrial processes such as those related to petroleum refining, from flue gases or exhaust gases from electric-power generation plants, the processes related to ammonia production, other industrial processes and plants, stationary internal combustion engines, or any operation where fossil fuels are oxidized or burned to provide the source of energy.

As noted above, the catalyst(s) will act both as a heating medium and chemical catalyst, as it quickens the rates of the chemical reactions and after being used, it can be recovered and returned to the process. As noted, above the heat added to the process will be provided by a microwave system or other suitable electromagnetic-radiation system. The carbon from the carbon dioxide and hydrogen directly fed to the reactor and/or hydrogen derived from the steam and/or hydrocarbons fed to the reactor in the presence of the catalyst and heat will combine to form petroleum products as described above.

Cooling water circulated around the outside of the reactor will carry away any excess heat generated in the reactor and maintain the proper reactor temperature profile. If appropriate, cooling water also may be circulated inside the reactor in tubes or other suitable apparatus. In summary, the temperature profile will be maintained by balancing the microwave power and frequency, the type and volume of the catalyst system, the reactor feeds and injection rates, the reactor cooling water rate, and other parameters. The cooling water as it absorbs heat from the reactor will become steam, which will be injected into the reactor as steam is required. The balance of the steam from the cooling system will be cooled and reused to cool the reactor or replaced by fresh water.

The magnetite and/or other catalysts and any other solid materials can be removed from the petroleum products by common separators such as centrifugal separators, magnetic separators, cyclonic separators, or any other reasonable method. The recovered magnetite or catalysts can be cleaned and returned to the reactor. Any ash can be removed and sold or disposed of reasonably.

The remaining petroleum products will be sold or transferred to a typical refining operation where they will be separated into the respective fuel and other products as desired.

BRIEF DESCRIPTION OF THE DRAWINGS

Other objectives, advantages, and applications of the present invention will be made apparent by the following detailed description of two preferred embodiments of the invention. The description makes reference to the accompanying drawings in which.

DETAILED DESCRIPTION OF PREFERRED EMBODIMENTS OF THE INVENTION

Figure 1:
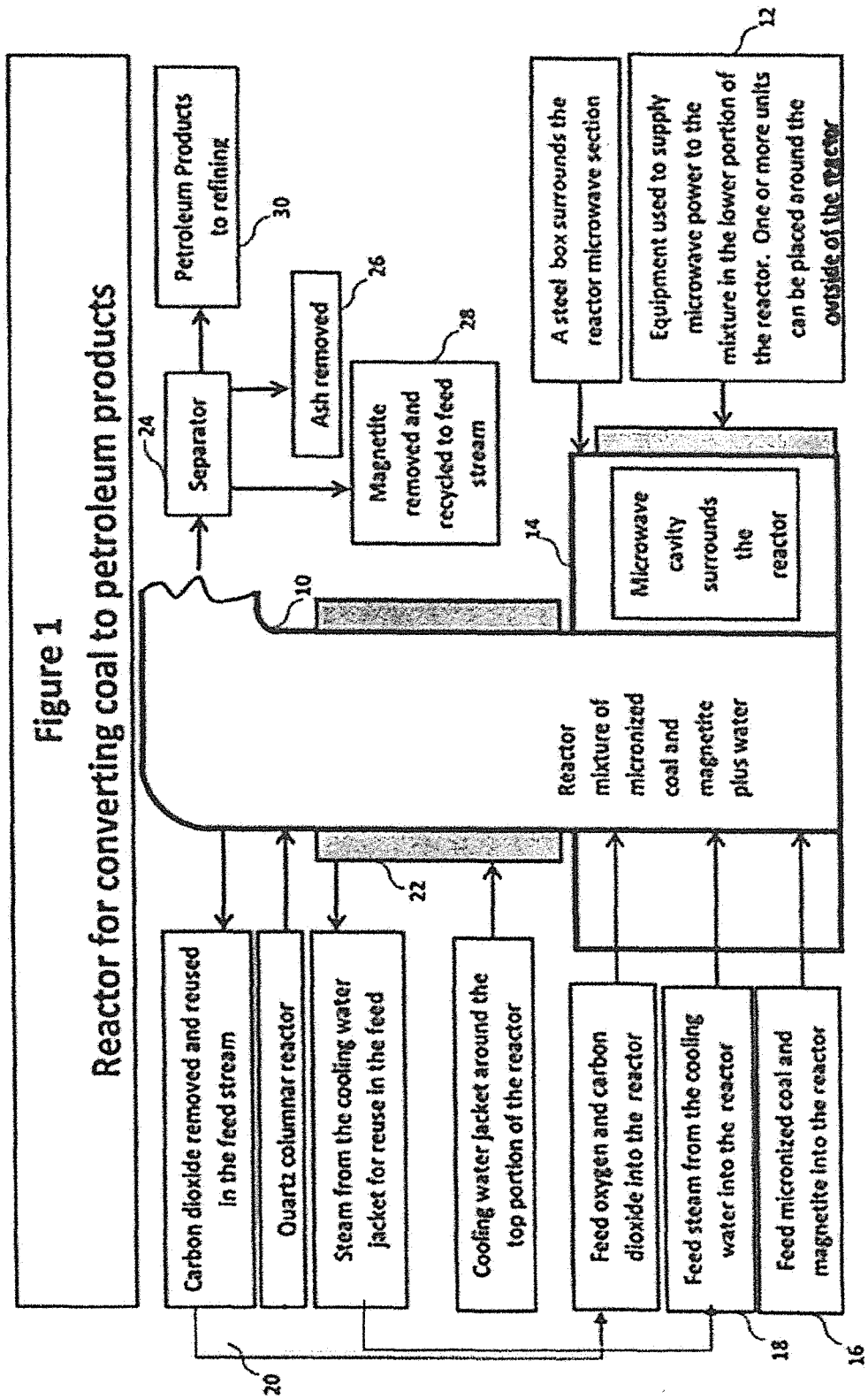
FIG. 1 is a schematic drawing of a first embodiment of the invention.

Referring to the schematic diagram of FIG. 1, the reactor proper comprises a vertically oriented furnace. The reactor 10 may have an internal lining of quartz or other suitable material(s) that are transparent to microwave power and can withstand the temperatures and pressures respective to the process. Preliminary experiments suggest that temperatures in the range of 1000 degrees Celsius or lower and pressures at about 150 psig or lower may be adequate for these reactions depending on the feeds, catalysts, microwave operation, output products, and other variables. However, temperatures and pressures could be significantly higher or lower depending on the application and the preference of the designer.

The reactor 10 may be reinforced with carbon fibers or any suitable microwave transparent material. The upper portion of the reactor 10 could have an outer casing of a material which is not transparent to microwaves. One or more microwave generators 12 will be supported in a cavity 14 which surrounds the base of the reactor 10. The reactor 10 may be enclosed within a steel container, or other suitable container, and the cavity between the container and reactor may be pressurized with nitrogen, or other suitable material(s), to support the reactor in a manner such that the reactor structure would be subjected only to the differences in pressures inside and outside the reactor.

The base of the reactor 10 is fed with micronized coal and micronized magnetite at 16. The coal is preferably micronized into the range of 10 microns, preferably by the process disclosed in my U.S. Pat. No. 8,440,946, the entire disclosure of which is incorporated herein by reference. The magnetite may be micronized to a similar particle size by the same process or other well known processes. Steam is also fed into the base of the reactor at 18, preferably from a cooling water jacket surrounding the upper section of the reactor 10 as will be subsequently described. The steam and the coal will react to produce hydrogen and carbon monoxide. Carbon dioxide produced by the reaction may be removed from the top of the reactor and fed into the base of the reactor at 20, possibly along with oxygen from an external source which may be added as necessary to maintain the reaction at a reasonable level.

As the hydrocarbon reaction products nse m the reactor, the upper end, or exothermic portion of the reactor is surrounded by a cooling water jacket 22, or another cooling mechanism that will maintain reasonable control of the reactor temperature.

The petroleum products produced in the reaction will pass out of the reactor into a separator 24 which divides the output product by removing ash at 26, removing magnetite which is removed and recycled to the feed stream 16 at 28. The remaining petroleum products are removed at 34 refining.

Since this process can convert carbon dioxide to carbon monoxide, it is possible to add carbon dioxide from naturally occurring sources and the carbon dioxide coproduction from industrial processes such as those related to petroleum refining, electric-power generation plants, other industrial plants, stationary internal combustion engines, or any operation where fossil fuels are oxidized or burned to provide the source of energy, thereby productively utilizing the carbon dioxide and eliminating its emission into the atmosphere.

Figure 2:
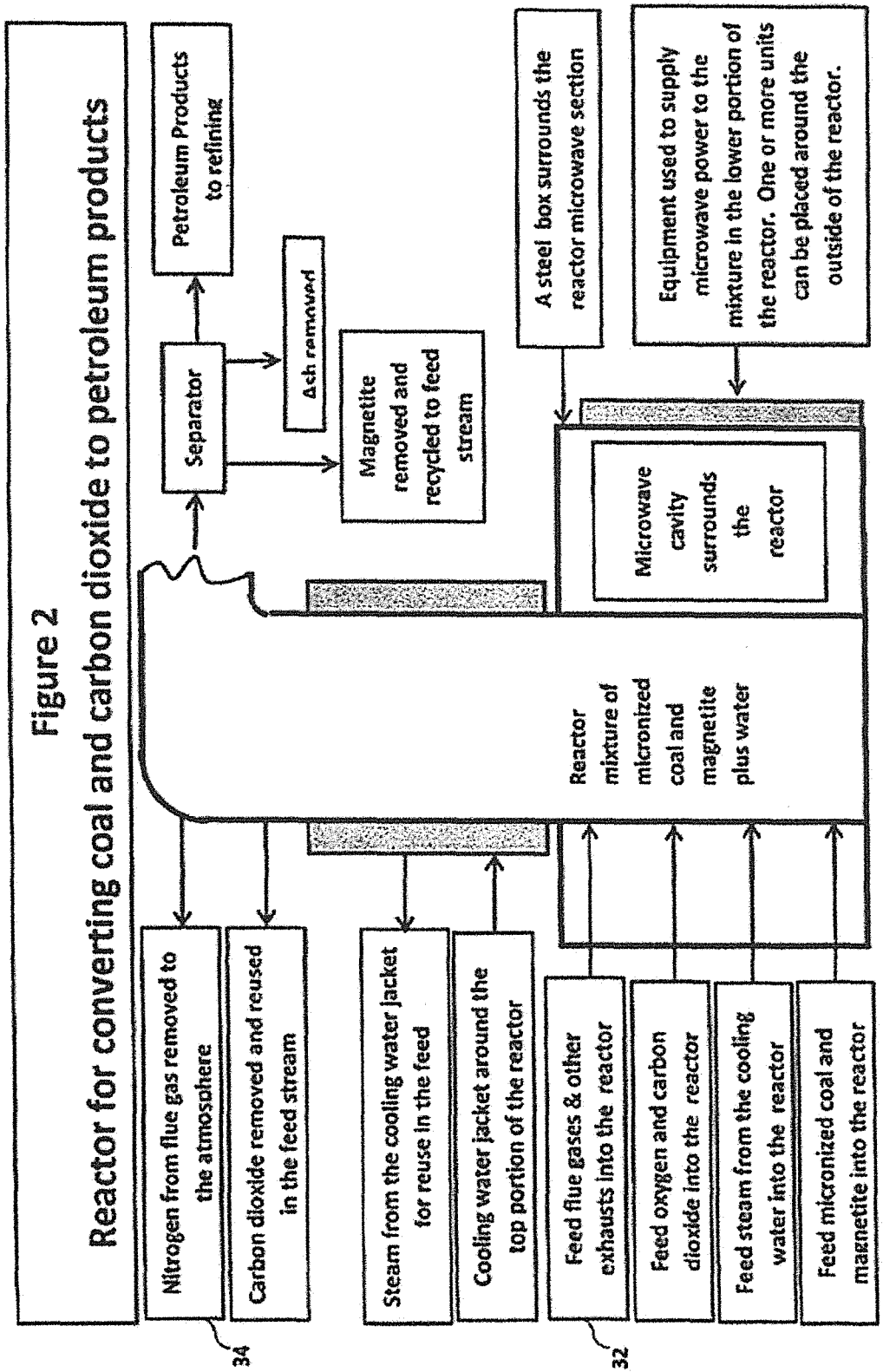
FIG. 2 is a schematic diagram of a second embodiment of the invention in which carbon dioxide produced from other fossil fuel processes can be added to the feed stream of the reactor thereby enhancing the production of petroleum products and avoiding release of the carbon dioxide effluent from the fossil fuel processes into the atmosphere.
Figure 3:
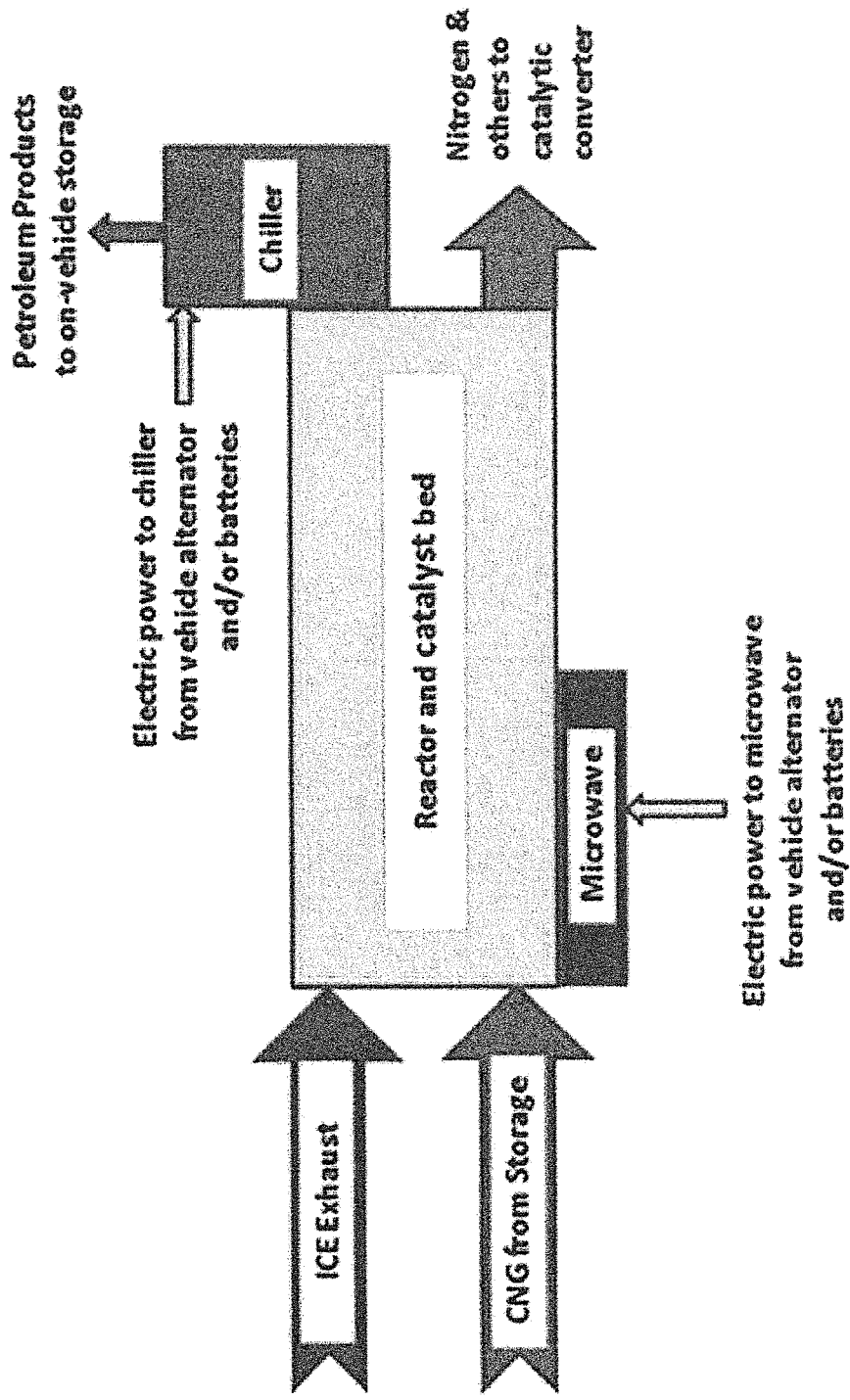
FIG. 3 is a schematic diagram of a reactor for converting transportation vehicle exhaust emissions to Petroleum Products.
Figure 4:
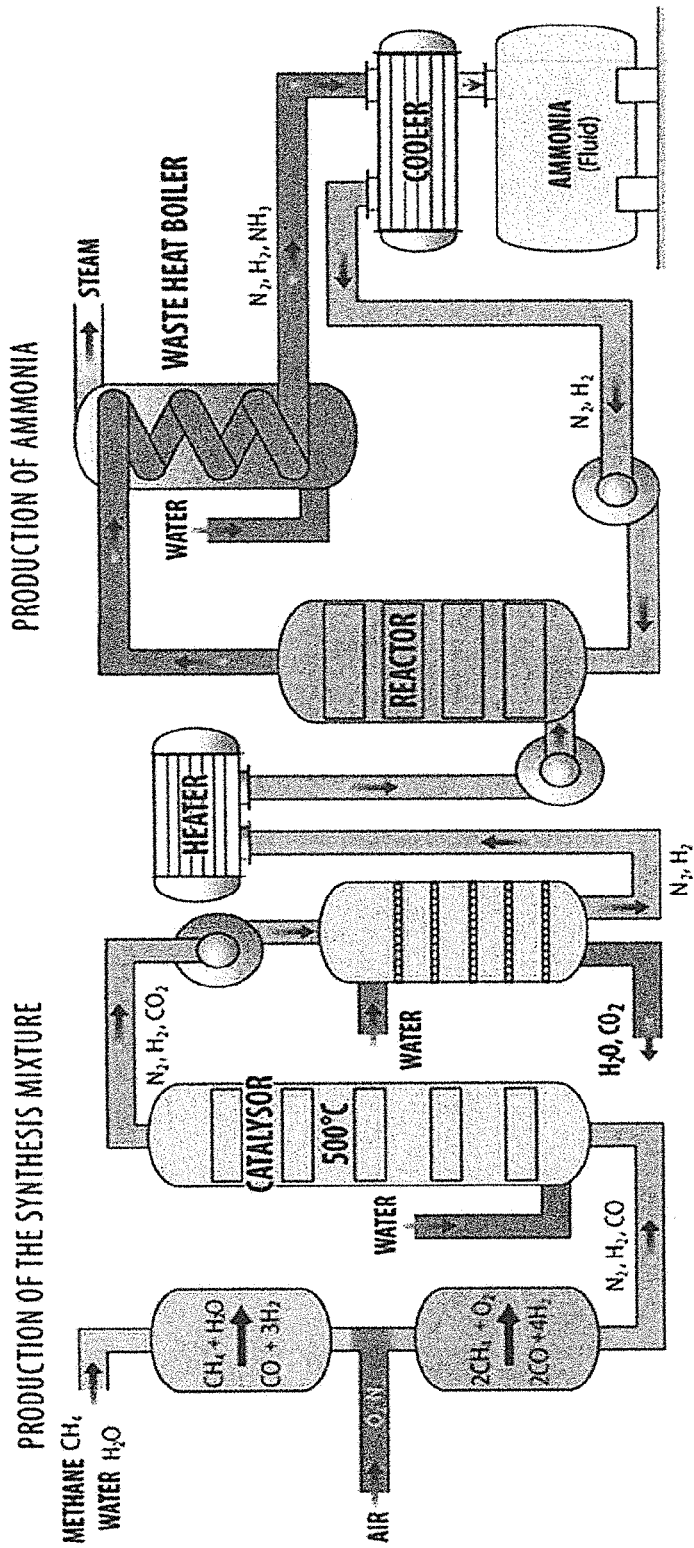
FIG. 4 is a schematic diagram of the Haber Bosch Ammonia process for producing ammonia from methane or natural gas.
Figure 5:
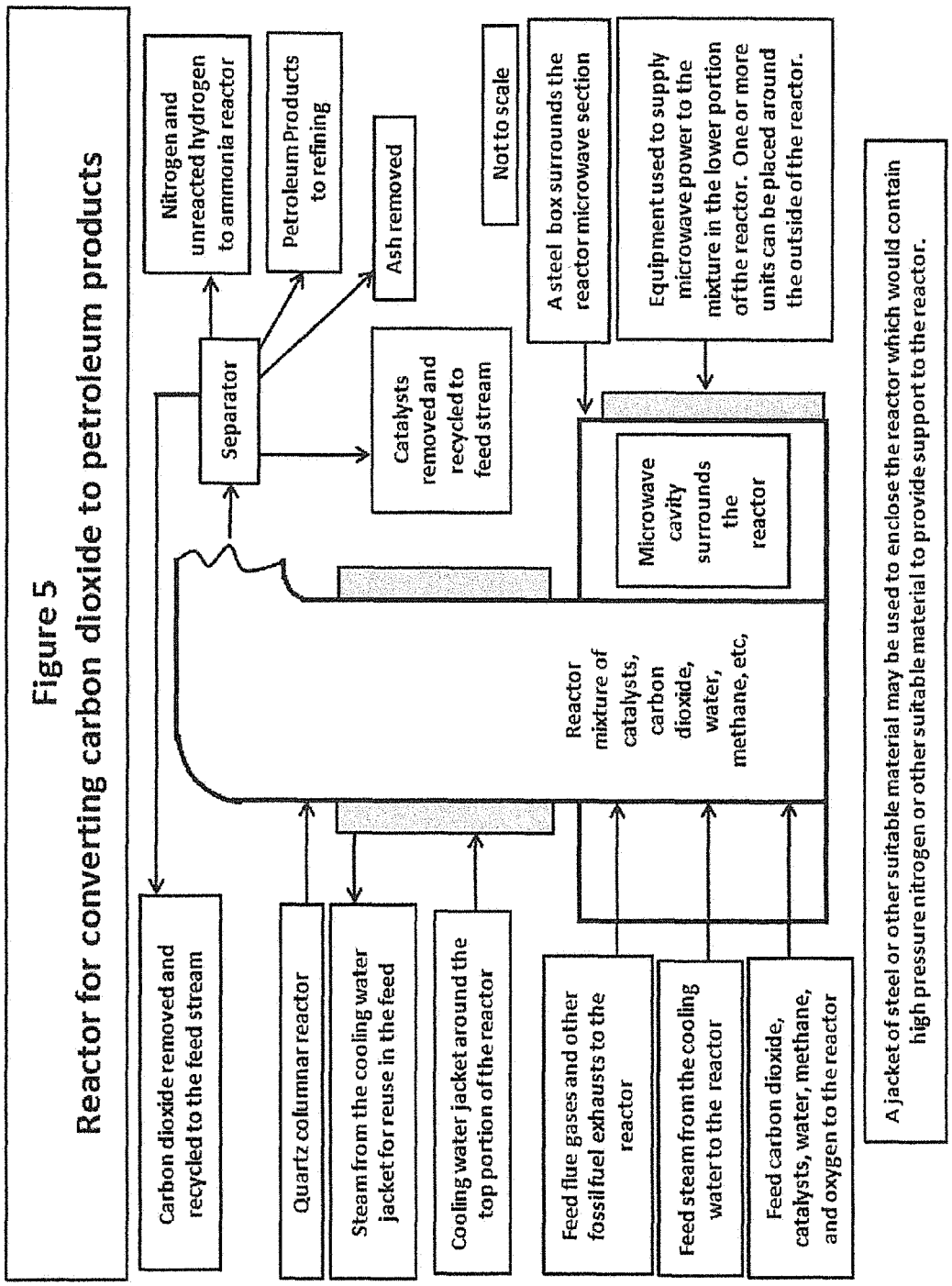
FIG. 5 is a schematic diagram of a reactor for converting carbon dioxide to petroleum products.
Figure 6:
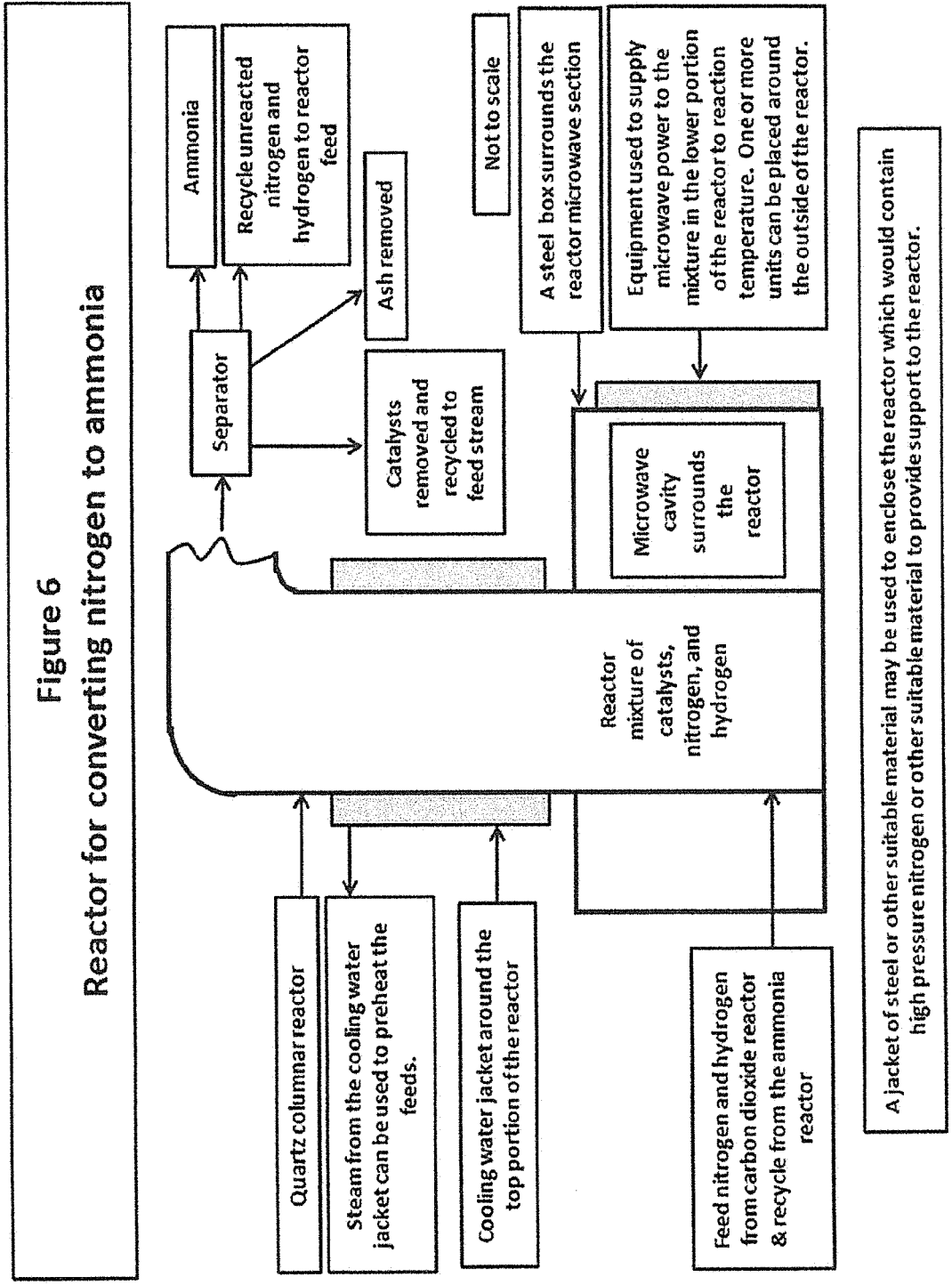
FIG. 6 is a schematic diagram of a reactor for converting nitrogen to ammonia.
Figure 7:
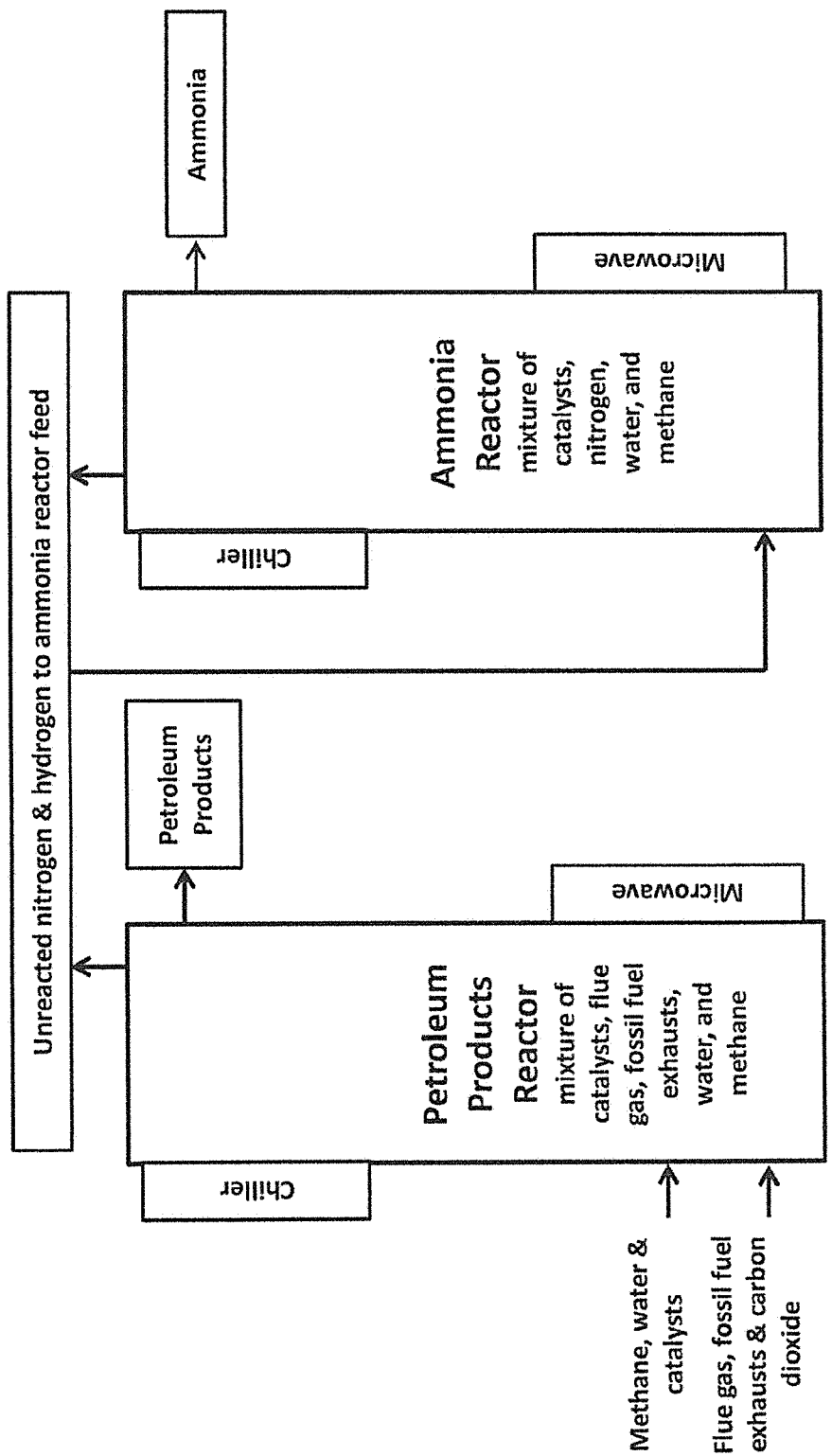
FIG. 7 is a schematic diagram of a reactor system for converting flue gas and other fossil fuel exhausts to petroleum products and ammonia with no carbon dioxide emissions.
Figure 8:
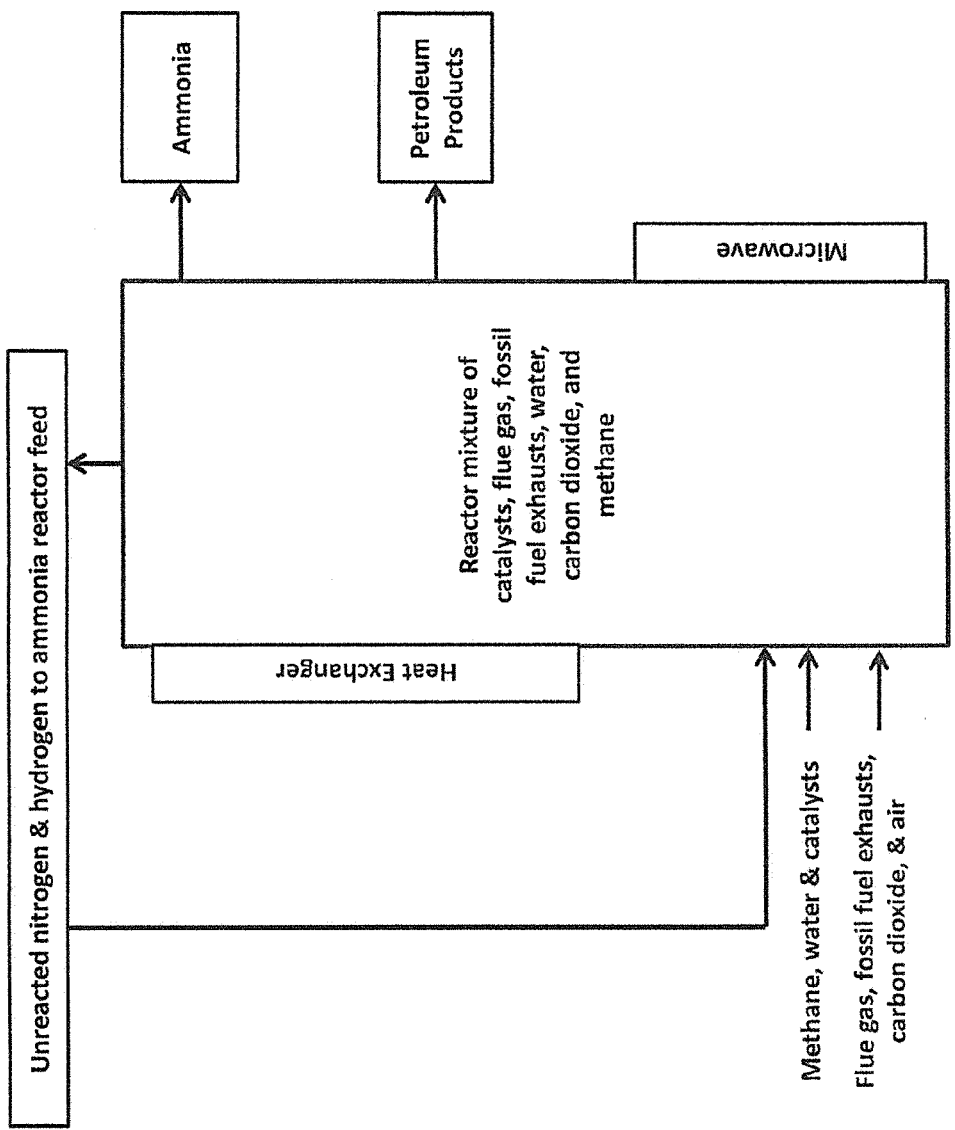
FIG. 8 is a schematic diagram of a reactor system for converting flue gas and other fossil fuel exhausts to petroleum products and ammonia with no carbon dioxide emissions.

FIG. 2 is a schematic diagram of a reactor, very similar to the reactor of FIG. 1, which differs only in that the effluents of other fossil fuel processes are fed into the base of the reactor at item 32. Additionally, nitrogen from the flue gas may be removed to the atmosphere at item 34. Thus, in addition to converting coal into petroleum products, the system of FIG. 2 may be used to minimize the emission of carbon dioxide into the atmosphere and the resultant enhancement of the greenhouse effect. As noted above, it may be desirable to use other carbonaceous materials that will react as a reductant for the carbon dioxide to improve the reaction in various ways.

The resulting processes of the present invention will produce a stream of clean petroleum products, cleansed of impurities such as sulfur, mercury, other metals, and ash.

The process variables may be changed to produce the preferred balance of petroleum products in the output stream. For example, during certain seasons there is a greater need for fuel oil/distillate and at other times there is a greater need for gasoline/naphtha. This selectivity can be accomplished by balancing the microwave power and frequency, the volume and type of the catalyst system, the reactor feeds and injection volumes, the reactor cooling water rate, and other parameters.

This single stage, continuous, simple process has a much better thermal efficiency than that of the currently used conventional processes. The proposed process requires a lower energy input than prior art processes. The present process is started by using microwave power to add heat to the reactor. As the process continues, it generates heat energy within the reactor and the microwave needs only to supply the incremental heat required to maintain a reasonable temperature profile over the reactor. The temperature profile, as has been noted, may range from about 1800° C. at the bottom of the reactor to about 500° C. at the top of the reactor.

Having thus described my invention, I claim:

1. A method for simultaneously consuming carbon dioxide and generating petroleum products, the method comprising:
   (a) introducing particles of a catalytic material, absorbent of microwave energy, into a higher-temperature portion of a reaction vessel;
   (b) introducing coal particles into the higher-temperature portion of the reaction vessel;
   (c) introducing steam into the higher-temperature portion of the reaction vessel;
   (d) obtaining carbon dioxide from combustion exhaust, and introducing the carbon dioxide thus obtained into the higher-temperature portion of the reaction vessel;
   (e) irradiating the higher-temperature portion of the reaction vessel with microwave energy absorbed by the catalytic material in the reactor so as to heat the catalytic material and drive an endothermic reaction of the coal and the steam, catalyzed by the catalytic material, that produces hydrogen and carbon monoxide, wherein (i) at least a portion of the hydrogen reacts with the carbon dioxide to produce water and carbon monoxide and (ii) at least a portion of the hydrogen undergoes exothermic reactions with the carbon monoxide, catalyzed by the catalytic material, to produce multiple petroleum products;
   (f) cooling a lower-temperature portion of the reaction vessel, thereby establishing a temperature gradient within the reaction vessel wherein the irradiated higher-temperature portion of the reaction vessel exhibits a higher temperature than the cooled lower-temperature portion of the reaction vessel, wherein at least a portion of heat required to maintain the temperature gradient is supplied by the microwave energy irradiating the higher-temperature portion of the reaction vessel;

(g) allowing a mixture that includes the multiple petroleum products to flow through the reaction vessel from the higher-temperature portion to the lower-temperature portion and leave the reaction vessel; and (h) separating at least a portion of the multiple petroleum products from the mixture that leaves the reaction vessel, wherein:

(i) less carbon dioxide leaves the reaction vessel in the mixture than is introduced into the higher-temperature portion of the reaction vessel; and (j) one or more nitrogen oxides present in the combustion exhaust are converted to nitrogen gas.

2. The method of claim 1 wherein one or more sulfur oxides present in the combustion exhaust are converted to elemental sulfur.

3. The method of claim 1 further comprising obtaining the combustion exhaust from a combustion engine on a moving vehicle.

4. The method of claim 1 further comprising recovering from the mixture that leaves the reaction vessel at least a portion of carbon dioxide present in that mixture and introducing the recovered carbon dioxide into the higher-temperature portion of the reaction vessel.

5. The method of claim 1 wherein the higher-temperature portion of the reaction vessel includes one or more windows comprising one of more materials that transmit the microwave energy, and the microwave energy irradiating the higher-temperature portion of the reaction vessel passes through the one or more windows.

6. The method of claim 1 wherein the lower-temperature portion of the reaction vessel is cooled by a cooling water jacket.

7. The method of claim 6 further comprising collecting at least a portion of steam generated by the cooling water jacket and introducing the collected steam into the higher-temperature portion of the reaction vessel.

8. The method of claim 1 wherein the higher-temperature portion of the reaction vessel includes quartz.

9. The method of claim 1 wherein the coal particles have a particle size of less than about 100 microns.

10. The method of claim 1 wherein the temperature gradient is established without relying on heat produced by oxidation of the coal particles.

11. The method of claim 1 further comprising introducing hydrogen or one or more hydrogen-rich compounds into the higher-temperature portion of the reaction vessel, wherein at least a portion of the introduced hydrogen or one or more hydrogen-rich compounds reacts with the carbon dioxide to produce water and carbon monoxide.

12. A method for simultaneously consuming carbon dioxide and generating petroleum products, the method comprising:

(a) introducing particles of a catalytic material, absorbent of microwave energy, into a higher-temperature portion of a reaction vessel;

(b) introducing coal particles into the higher-temperature portion of the reaction vessel;

(c) introducing steam into the higher-temperature portion of the reaction vessel;

(d) introducing carbon dioxide into the higher-temperature portion of the reaction vessel;

(e) introducing nitrogen into the higher-temperature portion of the reaction vessel;

(f) irradiating the higher-temperature portion of the reaction vessel with microwave energy absorbed by the catalytic material in the reactor so as to heat the catalytic material and drive an endothermic reaction of the coal and the steam, catalyzed by the catalytic material, that produces hydrogen and carbon monoxide, wherein (i) at least a portion of the hydrogen reacts with the carbon dioxide to produce water and carbon monoxide and (ii) at least a portion of the hydrogen undergoes exothermic reactions with the carbon monoxide, catalyzed by the catalytic material, to produce multiple petroleum products;

(g) cooling a lower-temperature portion of the reaction vessel, thereby establishing a temperature gradient within the reaction vessel wherein the irradiated higher-temperature portion of the reaction vessel exhibits a higher temperature than the cooled lower-temperature portion of the reaction vessel, wherein at least a portion of heat required to maintain the temperature gradient is supplied by the microwave energy irradiating the higher-temperature portion of the reaction vessel;

(h) allowing a mixture that includes the multiple petroleum products to flow through the reaction vessel from the higher-temperature portion to the lower-temperature portion and leave the reaction vessel;

(i) separating at least a portion of the multiple petroleum products from the mixture that leaves the reaction vessel; and (j) separating ammonia from the mixture that leaves the reaction vessel, wherein:

(k) a catalyzed reaction of hydrogen and nitrogen produces the ammonia; and (l) less carbon dioxide leaves the reaction vessel in the mixture than is introduced into the higher-temperature portion of the reaction vessel.

13. The method of claim 12 further comprising obtaining the carbon dioxide for introduction into the higher-temperature portion of the reaction vessel from combustion exhaust.

14. The method of claim 1 further comprising separating a mixture of carbon monoxide and hydrogen from the mixture that leaves the reaction vessel.

15. The method of claim 12 wherein the temperature gradient is established without relying on heat produced by oxidation of the coal particles.

16. The method of claim 12 further comprising introducing hydrogen or one or more hydrogen-rich compounds into the higher-temperature portion of the reaction vessel, wherein at least a portion of the introduced hydrogen or one or more hydrogen-rich compounds reacts with the carbon dioxide to produce water and carbon monoxide.

17. The method of claim 12 further comprising recovering from the mixture that leaves the reaction vessel at least a portion of carbon dioxide present in that mixture and introducing the recovered carbon dioxide into the higher-temperature portion of the reaction vessel.

18. The method of claim 12 wherein the higher-temperature portion of the reaction vessel includes one or more windows comprising one of more materials that transmit the microwave energy, and the microwave energy irradiating the higher-temperature portion of the reaction vessel passes through the one or more windows.

19. The method of claim 12 wherein the lower-temperature portion of the reaction vessel is cooled by a cooling water jacket.

20. The method of claim 18 further comprising collecting at least a portion of steam generated by the cooling water jacket and introducing the collected steam into the higher-temperature portion of the reaction vessel.

21. The method of claim 12 wherein the higher-temperature portion of the reaction vessel includes quartz.

22. The method of claim 12 wherein the coal particles have a particle size of less than about 100 microns.

23. The method of claim 12 further comprising separating a mixture of carbon monoxide and hydrogen from the mixture that leaves the reaction vessel.

* * * * *